H. N. WAYNE.
ARMORED INNER TUBE.
APPLICATION FILED OCT. 29, 1917.

1,297,278.

Patented Mar. 11, 1919.
2 SHEETS—SHEET 1.

INVENTOR
HERBERT N. WAYNE
BY Hazard & Miller
ATT'YS.

H. N. WAYNE.
ARMORED INNER TUBE.
APPLICATION FILED OCT. 29, 1917.

1,297,278. Patented Mar. 11, 1919.
2 SHEETS—SHEET 2.

INVENTOR
HERBERT N. WAYNE
BY Hazard and Miller
ATTY'S.

UNITED STATES PATENT OFFICE.

HERBERT N. WAYNE, OF LOS ANGELES, CALIFORNIA, ASSIGNOR TO ARMORCORD TIRE & RUBBER CO., A CORPORATION OF DELAWARE.

ARMORED INNER TUBE.

1,297,278.　　　Specification of Letters Patent.　　Patented Mar. 11, 1919.

Application filed October 29, 1917. Serial No. 199,098.

*To all whom it may concern:*

Be it known that I, HERBERT N. WAYNE, a citizen of the United States, residing at Los Angeles, in the county of Los Angeles and State of California, have invented new and useful Improvements in Armored Inner Tubes, of which the following is a specification.

This invention relates to a pneumatic tire and particularly pertains to an armored inner tube therefor.

It is the principal object of this invention to provide an inner tube to be inflated within a pneumatic tire casing which embodies certain features of construction which insure that it will be reinforced without losing its flexibility and will allow the tube to expand circumferentially and axially without interference from the reinforcement.

Another object of this invention is to provide an armored inner tube which will thoroughly reinforce the outer circumference and the side walls of the tube against blow-out and puncture and allow circumferential expansion of the tube, at the same time leaving the inner circumferential wall of the tube free to expand where reinforced by the tire rim and the opposing tire beads.

Another object of this invention is to provide a tube of the above character which may be formed by a simple process of construction to apply an armored wall to a pneumatic tubing which may thereafter be permanently shaped to conform to the casing within which it is to be positioned.

Other objects will appear hereinafter.

The invention is illustrated, by way of example, in the accompanying drawings in which.

Figure 1:
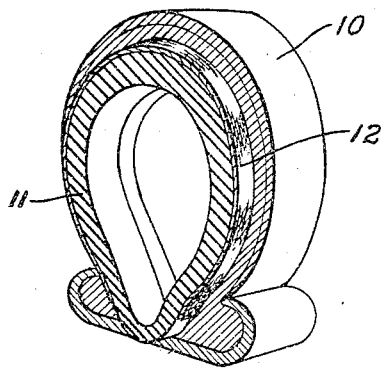
Figure 1 is a view in perspective illustrating a fragmentary portion of the tire casing within which the preferred form of the armored tube is positioned.

Referring more particularly to the drawings, 10 indicates the outer casing of a pneumatic tire adapted to be inflated by a specially formed inner tube 11, which is provided with an armored outer covering 12. In the preferred form of my invention as shown in Fig. 1 this covering consists of laterally arranged cords which extend around the outer circumference and along the sides of the tube, terminating at points adjacent but within the necks of the tire beads of the casing. When so constructed the cords may separate to provide circumferential expansion of the tube and will reinforce the main outer wall of the casing without limiting the expansive action of the inner circumferential wall of the tube which is held in a manner to prevent blow-out above the clencher beads of the casing and the clencher rim. The method of forming the armored casing and the tube will be hereinafter described.

Figure 2:
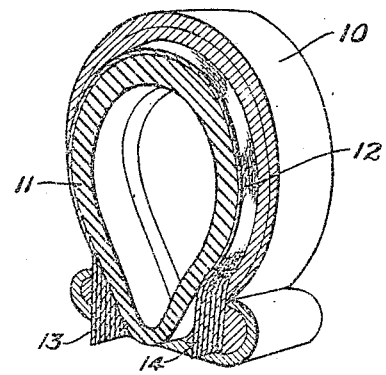
Fig. 2 is a view in perspective similar to Fig. 1, illustrating another form of the armored tube in position.

In the form of the device shown in Fig. 2 the armored covering is formed with loose end flaps 13 and 14 which are provided to entirely surround the inner circumference of the tube and protect it against chafing and pinching. Thus it will be seen that by combining the two functions of the cords the entire wall of the tube will be protected against the actions which are most injurious to it at various points along its wall.

Figure 9:
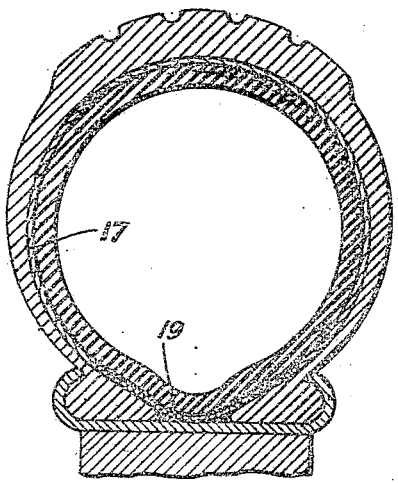
Fig. 9 is a view in transverse section illustrating the form of the armored tube shown in Fig. 8 as in position.
Figure 10:
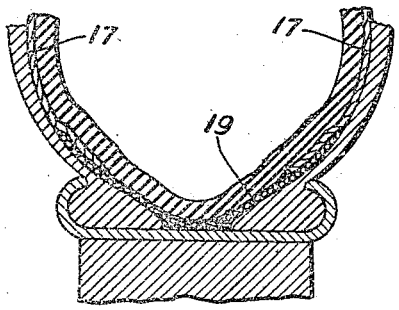
Fig. 10 is a fragmentary view in section illustrating the tube with its longitudinally and laterally extending cords overlapping along their contiguous edges and disposed within a tire casing.

Other forms of the tube are shown in Figs. 9 and 10 in which it will be seen that the space between the ends of the armored lateral cord covering is filled by a layer of longitudinally arranged cords to reinforce the inner wall of the tube circumferentially and permit it to expand laterally.

Figure 3:
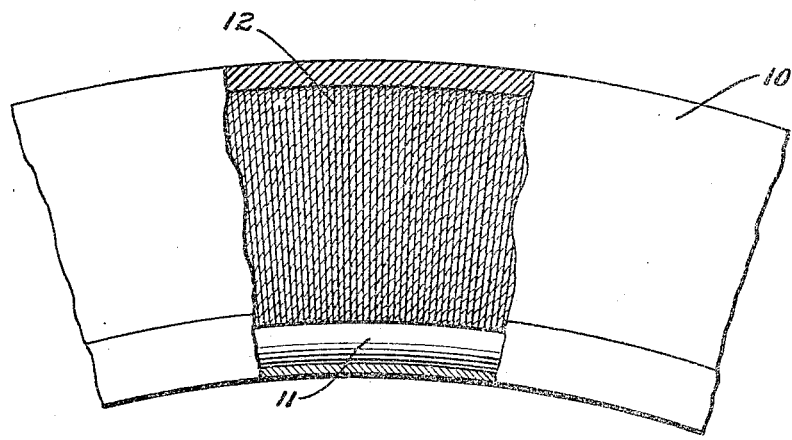
Fig. 3 is a view in side elevation illustrating a fragmentary portion of a tire casing and with parts broken away to disclose the position of the form of the tube shown in Fig. 1.
Figure 4:
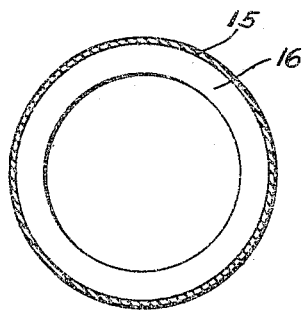
Fig. 4 is a view in transverse section illustrating the first step in the process of forming the armored covering.
Figure 5:
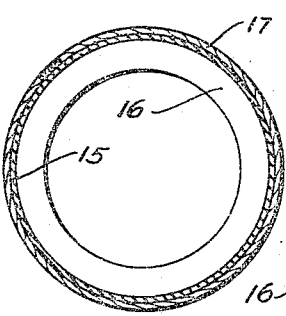
Fig. 5 is a view similar to Fig. 4 illustrating the second step in the formation of the covering.
Figure 6:
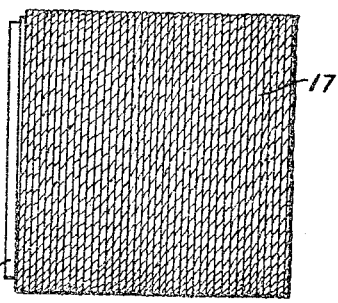
Fig. 6 is a view illustrating a fragmentary portion of the covering positioned upon its mandrel.

When forming the armored inner tube the outer protective covering is first formed by applying a thin coating 15 of rubber or other binding material to the outer surface of a straight cylindrical mandrel 16, after which a layer of cord 17 is applied to the rubber coating. This cord is wound around the mandrel and drawn tightly thereupon to cause the rubber coating of the mandrel to be pressed in between the strands of cord to act as a binder. This binding action is facilitated by first passing the cord through a solution of rubber cement. When the cord has been applied it will form a layer having the outward appearance indicated in Fig. 3, and will be only the thickness of the diameter of the cord, as the layer of rubber will be pressed between the cords. This cord layer is then cemented to the inner tube. When the form of tube shown in Fig. 1 is to be made the mandrel 16 is of a diameter substantially that of the circular cavity of the casing 10 so that the tube may be vulcanized within a circular cavity mold and will, when inflated, during the vulcanizing process, cause the inner circumference of the tube to be distended, as particularly shown in Fig. 1 and to allow the ends of the layer of cord to terminate at opposite sides of the tube and adjacent but within the neck of the casing beads. In the form of the device shown in Fig. 2 a still larger mandrel is used so that there will be a surplus of cord which will hang down from the distended inner circumferential wall to protect it when in position within the casing.

Figure 7:
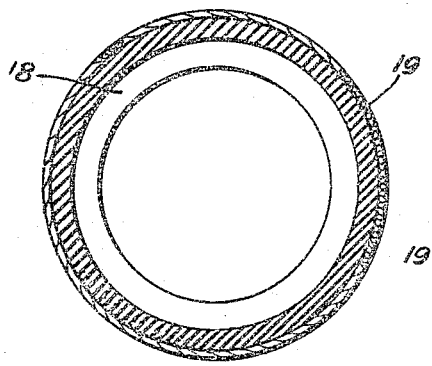
Fig. 7 is a view illustrating the manner in which the armored covering is placed upon the inner tube.
Figure 8:
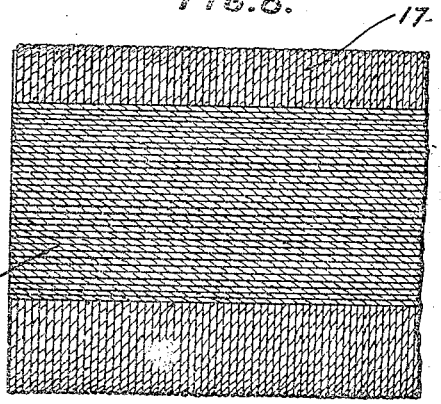
Fig. 8 is a view in elevation illustrating a fragmentary portion of another form of the armored covering in which longitudinally and laterally extending cords are used as reinforcements.

It is to be understood that the layer of cord formed upon the mandrel is split longitudinally and that in forming the armored tube shown in Fig. 8 the mandrel 16 is of a small diameter, after which the layer of cord 17 is transferred to a larger mandrel 18 over which the inner tube has been positioned, where it is cemented into place over the tube. The outer circumference of the inner tube is sufficiently larger than the small mandrel 16 to cause the cut edges of the layer of cord to be separated a considerable distance, as shown in Fig. 7. This space represents the inner circumferential wall of the tube and is filled by a layer 19 of longitudinally extending cords, which continue around the entire inner circumference of the tube. This layer of cords has been formed by being wrapped around a suitable mandrel and there bound together by rubber or cement. When the layer 19 has been cemented in place the armored tube is placed within a circular curing mold where it is inflated and vulcanized.

In the form of the device shown in Fig. 10 the contiguous edges of the cord layers 17 and 19 do not abut against each other but overlap to provide a reinforcement at the narrow portion of the side walls of the outer casing.

The tubes formed as described will conform to the cavity within a circular tire casing and will resiliently support it in a natural manner while the walls of the tube are limited in their movement, the outer walls being provided with circumferential expansion only and the inner wall with lateral expansion. The circumferential expansion will occur throughout substantially seven-eighths of the circumference of the tire while the lateral expansion will take place in the remaining one-eighth of the tube.

It is evident that the weakest points in the tire casing are along the reduced side walls of the casing adjacent the tire beads.

It will be understood that one or more layers of cord or thread may be used. If a single layer is used, the thickness of the cord or thread is increased so as to produce a requisite strength. However, if more than one layer is used, the thickness of the cord or thread may be reduced in proportion to the strength required.

It will thus be seen that the tube here disclosed may be easily and economically manufactured and will provide an armored protecting cover which will allow the tube to have flexible movement and at the same time will prevent it from being chafed, punctured, pinched or blown out.

While I have shown the preferred construction of my armored inner tube as now known to me, it will be understood that various changes in the combination, construction and arrangement of parts may be made by those skilled in the art without departing from the spirit of my invention as claimed.

I claim:

1. A tire tube comprising a wall of elastic material, and a reinforcing layer associated with the elastic wall comprising a series of substantially parallel cords extending throughout a certain circumferential part of the elastic wall, the remaining circumferential part of the elastic wall being free from association with said cords, whereby the first mentioned part is allowed elastic expansion in a direction transverse of the cords but is limited in expansion longitudinal of the cords and the second mentioned part is allowed elastic expansion in the direction in which expansion is limited in the first mentioned part.

2. A tire tube comprising a wall of elastic material, and a reinforcing layer associated with the elastic wall comprising a series of transversely extending cords around the outer circumferential part of the tube, the inner circumferential part of the tube being free of association with said transverse cords; whereby the outer circumferential part of the tube is allowed elastic longitudinal expansion but is limited in lateral expansion and the inner circumferential part of the tube is allowed lateral expansion.

3. A tire tube comprising a wall of elastic material, and a reinforcing layer associated with the elastic wall comprising a series of transversely extending cords around the outer circumferential part of the tube, and another series of longitudinally extending cords around the inner circumferential part of the tube; whereby the outer circumferential part of the tube is allowed elastic longitudinal expansion but is limited in lateral expansion and the inner circumferential part of the tube is allowed elastic lateral expansion but is limited in longitudinal expansion.

4. A tire tube comprising a wall of elastic material, and a reinforcing layer associated with the elastic wall comprising a series of transversely extending cords around the outer circumferential part of the tube, and another series of longitudinally extending cords around the inner circumferential part of the tube, the two series of cords somewhat overlapping each other so that at the overlap the tube wall is reinforced by both series of cords; whereby the outer circumferential part of the tube is allowed elastic longitudinal expansion but is limited in lateral expansion and the inner circumferential part of the tube is allowed elastic lateral expansion but is limited in longitudinal expansion.

5. A tire tube comprising a wall of elastic material, and a reinforcing layer associated with the elastic wall comprising a series of longitudinally extending cords extending around the inner circumferential portion of the tube, the outer circumferential portion of the tube being free from association with said longitudinal cords; so that the inner circumferential part of the tube is allowed elastic lateral expansion but limited in longitudinal expansion.

6. A tire tube comprising an inner wall of elastic material, an outer wall of non-elastic material covering the outer circumference and the sides of the tube whereby the tube may have limited longitudinal expansion, and means whereby the remainder of the tube will be protected from chafing and abrasion and will be permitted to expand laterally of the tire.

In testimony whereof I have signed my name to this specification.

HERBERT N. WAYNE.